United States Patent [19]

Katayama et al.

[11] Patent Number: 4,850,578

[45] Date of Patent: Jul. 25, 1989

[54] FLUID-FILLED ELASTIC MOUNT FOR DAMPING A WIDE FREQUENCY RANGE OF VIBRATIONS

[75] Inventors: Motohiro Katayama, Kasugai; Tatsuya Suzuki, Komaki, both of Japan

[73] Assignee: Tokai Rubber Industries, Ltd., Japan

[21] Appl. No.: 232,132

[22] Filed: Aug. 15, 1988

[30] Foreign Application Priority Data

Aug. 21, 1987 [JP] Japan .................. 62-208779

[51] Int. Cl.⁴ .................. F16M 5/00; F16M 13/00; F16F 9/16; F16F 7/10
[52] U.S. Cl. .................. 267/140.1; 188/379; 248/562; 267/219
[58] Field of Search .............. 267/140.1, 219, 35; 180/300, 312; 248/562, 636, 638; 123/192 R, 195 A; 188/378, 379

[56] References Cited

U.S. PATENT DOCUMENTS

| | | | |
|---|---|---|---|
| 4,511,126 | 4/1985 | Bernuchon et al. | 267/140.1 |
| 4,721,288 | 1/1988 | Andra et al. | 267/219 |
| 4,721,292 | 1/1988 | Saito | 267/140.1 |

FOREIGN PATENT DOCUMENTS

| | | |
|---|---|---|
| 0040290 | 2/1981 | European Pat. Off. . |
| 2905090 | 8/1980 | Fed. Rep. of Germany . |
| 2905091 | 8/1980 | Fed. Rep. of Germany . |
| 0278638 | 12/1986 | Japan .................. 267/219 |

*Primary Examiner*—Robert J. Oberleitner
*Attorney, Agent, or Firm*—Oliff & Berridge

[57] ABSTRACT

A fluid-filled elastic mount including an elastic body for connection of a first and a second member, a closure member secured to the second member and cooperating with at least the elastic body to define a fluid chamber filled with a non-compressible fluid, a device for dividing the fluid chamber into a first chamber on the side of the first member and a second chamber on the side of the second member, a device for defining a passage for restricted communication between the first and second chambers, and a device for accommodating a pressure difference between the first and second chambers. The elastic mount further includes an operating device which has a recess, divides the first chamber into a first section on the side of the first member, and a second section on the side of the partition device in which the recess is open, cooperates with an inner wall surface of the first chamber to define an annular restriction gap, and is elastically connected to the first member, a mass member of a predetermined mass located in the recess, a first elastic member for elastic connection between the mass member and the operating device, a first passage supported by the mass member for fluid communication between the recess and the second section, and a second passage supported by the operating device for fluid communication between the recess and the first section.

11 Claims, 1 Drawing Sheet

FLUID-FILLED ELASTIC MOUNT FOR DAMPING A WIDE FREQUENCY RANGE OF VIBRATIONS

BACKGROUND OF THE INVENTION

1. Field of the Invention

The present invention relates to a fluid-filled elastic mount such as an engine mount for an automotive vehicle, and in particular to such elastic mounts which effectively damp or isolate vibration in a wide frequency range.

2. Related Art Statement and Problems Solved by the Invention

A mounting device such as an engine mount for an automobile is required to effectively damp or isolate vibration in a wide frequency range which essentially includes a comparatively low frequency range.

Recently there has been proposed a "fluid-filled" elastic mount, as one of such mounting devices, which includes (a) a first and a second support member which are disposed opposite to each other in a load-receiving direction in which a vibrational load is applied to the elastic mount, (b) an elastic body interposed between the first and second support member, for elastic connection of the first and second support member, (c) a closure member secured to the second support member and cooperating with at least the elastic body to define a fluid chamber filled with a non-compressible fluid, the closure member including a flexible portion, (d) a partition member for dividing the fluid chamber into a pressure-receiving chamber formed on the side of the first support member, and an equilibrium chamber formed on the side of the closure member; and (e) a restricted passage for restricted fluid communication between the pressure-receiving and equilibrium chambers. The elastic mount of this type is disclosed in German Patent Applications laid-open under OLS No. 2905090 and OLS No. 2905091.

In the elastic mount constructed as indicated above, the vibration with which the non-compressible fluid in the restricted passage resonates is effectively damped. Stated differently, the restricted passage is constructed or "tuned" so that the fluid therein resonates with vibration having a predetermined frequency, specifically in a comparatively low frequency range. Thus, the comparatively low frequency vibration is effectively damped by this elastic mount.

Although the above-indicated type elastic mount is capable of effectively damping the comparatively low frequency vibration based on the resonant response of the fluid in the restricted passage, the mount is not capable of sufficiently damping or isolating vibration in different frequency ranges from the comparatively low range, particularly a range higher than the comparatively low range. When the comparatively high frequency vibration is applied to the elastic mount, the fluid in the restricted passage becomes rigid, whereby the fluid becomes unable to flow between the pressure-receiving and equilibrium chambers through the restricted passage, which leads to rather lowering the vibration absorbing capability of the elastic mount.

Another fluid-filled elastic mount has been proposed in European Patent Application laid-open under EP-A No. 0040290 and U.S. Pat. No. 4,511,126. The elastic mount has, in addition to the above-indicated elements (a) through (f), accommodation means for accommodating a pressure difference between the pressure-receiving and equilibrium chambers, the accommodation means including a movable member which is displaceable or deformable a predetermined distance or amount due to the pressure difference.

In this type elastic mount, the accommodation means is constructed or "tuned" so that vibration with a predetermined frequency, specifically a comparatively high frequency vibration, is effectively isolated based on deformation or displacement of the movable member due to a pressure difference produced between the pressure-receiving and equilibrium chambers. The frequency of the vibration isolated with the movable member may be determined to be higher than the comparatively low frequency of the vibration damped with the restricted passage. Thus, the comparatively high frequency vibration can be isolated by this elastic mount.

Thus, the fluid-filled elastic mount of the above-indicated type effectively damps or isolates the vibrations in the two different frequency ranges, namely, the low frequency range associated with the restricted passage and the comparatively high frequency range associated with the movable member, but suffers from the problem of being incapable of sufficiently isolating vibration in a frequency range higher than the two different ranges covered by the conventional elastic mount. An upper limit of the comparatively high frequency range associated with the movable member is not more than about 150–200 Hz, and accordingly vibration with a frequency higher than about 150–200 Hz is not effectively isolated based on the movement of the movable member of the conventional elastic mount.

SUMMARY OF THE INVENTION

It is therefore a primary object of the present invention to provide a fluid-filled elastic mount which is capable of effectively damping or isolating a wide frequency range of vibration.

According to the present invention, there is provided a fluid-filled elastic mount for flexible coupling of two members, comprising (a) first support means and second support means which are disposed opposite to each other in a load-receiving direction in which a vibrational load is applied to the elastic mount; (b) an elastic body interposed between the first and second support means, for elastic connection of the first and second support means; (c) a closure member secured to the second support means and cooperating with at least the elastic body to define a fluid chamber filled with a non-compressible fluid, the closure member including a flexible portion; (d) partition means for dividing the fluid chamber into a pressure-receiving chamber formed on the side of the first support means, and an equilibrium chamber formed on the side of the closure member; (e) communication means for defining a restricted passage for restricted fluid communication between the pressure-receiving and equilibrium chambers; (f) accommodation means for accommodating a pressure difference between the pressure-receiving and equilibrium chambers, the accommodation means including a movable member which is deformable or displaceable in the load-receiving direction due to the pressure difference; (g) operating means disposed in the pressure-receiving chamber and secured to the first support means, the operating means including an operating member having a recess of a predetermined depth, and dividing the pressure-receiving into a first section formed on the side of the first support means, and a second section formed on the side of the partition means, the recess being open in the second section, the operating member cooperating with an inner wall surface of the pressure-receiving chamber to define an annular restriction gap between the first and second sections, the operating member being elastically connected to the first support means; (h) a mass member of a predetermined mass located in the recess; (i) a first elastic member for elastic connection between the mass member and the operating member, whereby the recess is closed by the mass member and the first elastic member; (j) first means for defining a first communication passage for fluid communication between the recess and the second section, the first means being supported by the mass member; and second means for defining a second communication passage for fluid communication between the recess and the first section, the second means being supported by the operating means.

The fluid-filled elastic mount constructed as described above, serves to damp a predetermined, namely, low frequency vibration based on the resonant response of the non-compressible fluid in the restricted passage, and isolate a predetermined, comparatively high frequency vibration based on the deformation or displacement of the movable member, similar to conventional fluid-filled elastic mounts. The restricted passage and the movable member may be constructed or "tuned" so that they damp or isolate the vibrations with the low and comparatively high frequencies, respectively.

Upon application of a vibrational load to the present elastic mount through the first and second support means, the non-compressible fluid is forced to flow between the first and second sections of the pressure-receiving chamber through the restriction gap located between the operating member and the inner wall surface of the pressure-receiving chamber, due to relative displacement of the first and second support means in the load-receiving direction. The vibration with which the fluid in the restriction gap resonates is effectively isolated. The restriction gap is constructed or "tuned" so that the fluid therein will resonate with vibration having a first predetermined frequency.

Moreover, in the present elastic mount, the fluid in the first and second sections of the pressure-receiving chamber is forced to flow through the first communication passage supported by the mass member, due to the relative displacement of the first and second support means, while the mass member itself is elastically connected to the operating member. Based on a synergistic resonant response of the fluid in the first communication passage and the mass member itself, vibration with a second predetermined frequency is effectively isolated. The first communication passage and the mass member are constructed or "tuned" so as to effectively isolate the vibration having the second predetermined frequency.

Additionally, in the present elastic mount, the operating member is elastically secured to the first support means and accordingly, based on the resonant response of the operating member, vibration with a third predetermined frequency is effectively isolated. The operating member is constructed or "tuned" so as to effectively isolate the vibration with the third predetermined frequency.

Thus, the present fluid-filled elastic mount serves to damp or isolate the vibrations in the five frequency ranges including the two frequency ranges which have been covered by conventional elastic mounts. Stated differently, the present elastic mount is capable of effectively absorbing (or isolating) vibration in a wide frequency range which includes the comparatively low frequency range covered by conventional elastic mounts, and the additional frequency ranges different from the comparatively low range.

According to the present invention, each of the three frequencies, namely, the first predetermined frequency to which the restriction gap defined by the operating member and the inner wall surface of the pressure-receiving chamber is tuned, the second predetermined frequency tuned in association with the synergistic resonant response of the fluid in the first communication passage and the mass member itself, and the third predetermined frequency to which the operating member is tuned, may be selected to be higher than the frequency tuned in association with the movement of the movable member (and the frequency to which the restricted passage is tuned). Thus, high frequency vibration, such as vibration with a more than about 150-200 Hz frequency, which can not be absorbed with the movable member of conventional elastic mounts, is effectively isolated by the present elastic mount.

In a preferred embodiment of the fluid-filled elastic mount of the invention, the operating means further includes a second elastic member for the elastic connection between the operating member and the first support means, the operating member being formed of a rigid material. The operating means may further include a fixation member which is secured to the first support means and to which the operating member is connected through the second elastic member. It is recommended that the second means be supported by at least one of the operating member, the second elastic member and the fixation member.

In another embodiment of the elastic mount of the invention, the operating member is formed of an elastic material, and elastically connected to the first support means due to elasticity of the operating member. It is recommended that the second means be supported by the operating member.

In yet another embodiment of the elastic mount of the invention, the second support means includes a cylindrical member for defining the inner wall surface of the pressure-receiving chamber, while the operating member includes a cylindrical portion for partially defining the recess and cooperating with the cylindrical member to define the annular restriction gap. It is preferred that the first elastic member include a metallic ring fitted in the cylindrical portion of the operating member, the mass member being connected to the operating member through the first elastic member with the ring fitted in the cylindrical portion. A cushioning member may be provided on an outer circumferential surface of the cylindrical portion of the operating member for absorbing a shock produced from abutment of the operating member against the inner wall surface of the pressure-receiving chamber.

In still another embodiment of the elastic mount of the invention, the mount further comprises a first stopper member disposed in the first section for preventing the operating member from being excessively displaced toward the first support means.

In another embodiment of the elastic mount of the invention, the mount further comprises a second stopper member for preventing the operating member from being excessively displaced toward the second support means, the partition means serving as the second stopper member.

BRIEF DESCRIPTION OF THE DRAWINGS

The above and other objects, features and advantages of the present invention will become more apparent from reading the following description of the preferred embodiment of the invention, when considered in conjunction with the accompanying drawings, in which.

DESCRIPTION OF THE PREFERRED EMBODIMENT

To further illustrate the present invention, the preferred embodiment of the fluid-filled elastic mount of the invention will be described in detail, by reference to the accompanying drawings.

Figure 1:
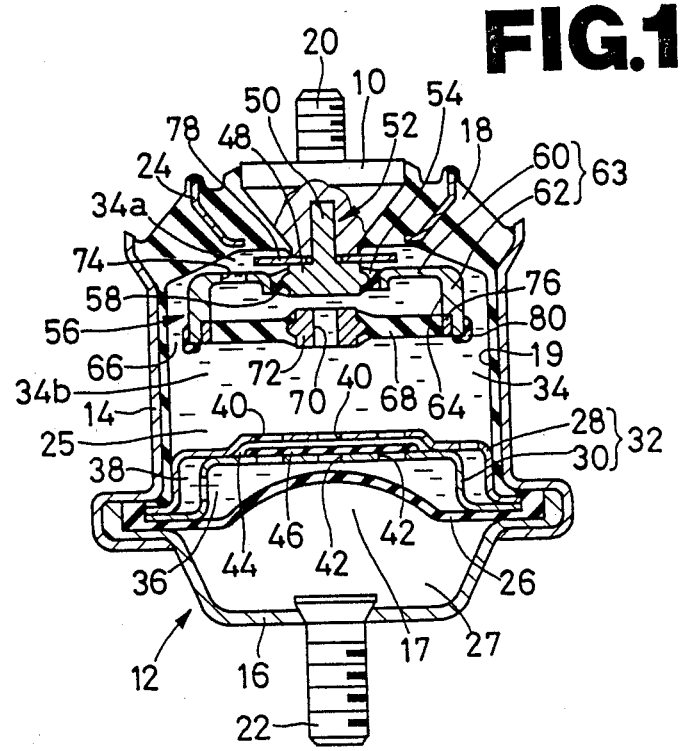
FIG. 1 is an elevational view in cross section of one embodiment of a fluid-filled elastic mount of the invention in the form of an engine mount.

Referring first to FIG. 1, reference numerals 10 and 12 designate first and second support means in the form of a first and a second metallic support member, respectively, which are disposed opposite to each other with a predetermined distance therebetween in a load-receiving direction in which a vibrational load is applied to the present fluid-filled elastic mount which is used for mounting an engine on the chassis of an automotive vehicle (i.e., a vertical direction as viewed in FIG. 1).

The first support member 10 has the shape of an inverted truncated cone the maximum diameter of which is comparatively small, and is opposed at the truncated end thereof to the second support member 12. The second support member 12 includes a metallic, dished bottom member 16 which is open toward the first support member 10, and a metallic cylindrical member 14 which is fluid-tightly engaged with the open end of the bottom member 16 by caulking of one of opposite axial ends of the cylindrical member 14, whereby the second support member 12 has a comparatively large diameter space 17 therein. The second support member 12 is positioned with respect to the first support member 10 such that, with the inner space 17 open toward the first support member 10, the second support member 12 is concentric with the first support member 10. The first and second support members 10, 12 are elastically connected to each other by a rubber body 18 formed by vulcanization therebetween. The rubber body 18 has a tapered shape, and is fixed at the small diameter end thereof to a side surface of the truncated cone-shaped first support member 10 and at the large diameter end thereof to an inner surface at the opening of the space 17 of the second support member 12, whereby the space 17 is closed by the first support member 10 and the rubber body 18.

A first and a second mounting bolt 20 and 22 are provided on the first and second support members 10, 12, respectively, such that the bolts 20, 22 extend outward in the above-indicated load-receiving direction. The first and second mounting bolts 20, 22 are joined to the side of the chassis or engine of the automotive vehicle, and the side of the engine or chassis of the vehicle, respectively, whereby the engine, or a power unit incorporating the engine, is supported on the chassis such that the chassis is isolated from vibration produced from operation of the engine. In FIG. 1, reference numeral 24 designates a metallic reinforcement member having a cylindrical tapered shape. The reinforcement member 24 is embedded in an intermediate portion of the rubber body 18 when the rubber body 18 is vulcanized to the first and second support members 10, 12.

As shown in FIG. 1, a closure member in the form of an elastic (flexible) diaphragm 26 formed of rubber is secured to the second support member 12 with a circumferential portion thereof fluid-tightly held between the cylindrical and bottom members 14, 16. Thus, a fluid chamber 25 is formed fluid-tight between the first support member 10 and the diaphragm 26. The fluid chamber 25 is filled with a suitable non-compressible fluid such as water, alkyleneglycol, polyalkyleneglycol, silicone oil or the like. Reference numeral 27 designates an air chamber defined by the diaphragm 26 and the bottom member 16, and is filled with air. The air chamber 27 is adapted to permit elastic deformation of the diaphragm 26.

A partition means 32 consisting of a pair of superimposed metallic partition members 28, 30 is disposed in the fluid chamber 25 such that, similar to the diaphragm 26, each of the partition members 28, 30 is secured to the second support member 12 with a circumferential portion thereof fluid-tightly held between the cylindrical and bottom members 14, 16. Thus, the fluid chamber 25 is divided by the partition means 32 into a pressure-receiving chamber 34 on the side of the first support member 10, and an equilibrium chamber 36 on the side of the diaphragm 26. The pair of partition members 28, 30 cooperate to define a restricted passage 38 which extends circumferentially of the partition members 28, 30. The restricted passage 38 permits restricted fluid communication between the pressure-receiving and equilibrium chambers 34, 36.

Upon application of a vibrational load to the elastic mount through the mounting bolts 20, 22 and the support members 10, 12, there is produced a difference in fluid pressure between the pressure-receiving and equibrium chambers 34, 36, whereby the non-compressible fluid is forced to flow between the two chambers 34, 36 through the restricted passage 38. The vibration with which the non-compressible fluid in the restricted passage 38 resonates is effectively isolated or damped. The restricted passage 38 is constructed or "tuned" so that the fluid in the passage 38 will resonate with vibration having a comparatively low range of frequency f1, such as vibration associated with engine shake. Thus, the comparatively low frequency vibration applied to the mount is effectively damped based on the resonant response of the fluid in the restricted passage 38.

The pair of partition members 28, 30 cooperate with each other to define a circular flat space 44 at central portions thereof, in addition to the restricted passage 38 located at the peripheral portions thereof. The flat space 44 communicates with the pressure-receiving chamber 34 through a plurality of fluid passages 40 formed through the upper partition member 28, and with the equilibrium chamber 36 through a plurality of fluid passages 42 formed through the lower partition member 30. A movable member in the form of a plate 46 formed of rubber or the like is disposed in the flat space 44 such that the plate 46 prevents fluid communication between the pressure-receiving and equilibrium chambers and is movable or displaceable over a predetermined distance limited by the pair of partition members 28, 30, in the load-receiving direction.

The movable plate 46 is moved or displaced in the load-receiving direction, i.e., a direction in which to accommodate a difference in fluid pressure between the pressure-receiving and equilibrium chambers 34, 36. When the movable plate 46 is moved within the flat space 44 upon application of a vibrational load to the elastic mount, the non-compressible fluid is also moved or flown through the fluid passages 40 of the upper partition member 28. The vibration with which the fluid in the fluid passages 40 resonates is effectively isolated. The fluid passages 40 and/or the movable plate 46 are-/is constructed or "tuned" so that the fluid in the passages 40 will resonate with vibration having an intermediate range of frequency f2, such as vibration associated with idling. Thus, the intermediate range frequency vibration applied to the mount is effectively isolated based on the resonant response of the fluid in the fluid passages 40 (or the movement of the movable plate 46 within the flat space 44).

An operating device 56 is disposed in the pressure-receiving chamber 34 and secured to the truncated end of the first support member 10. The operating device 56 includes a fixation member 52 consisting of a circular support portion 48 of a comparatively large thickness and a fixation portion 50 protruding concentrically from the support portion 48. The fixation member 52 is secured at the fixation portion 50 concentrically to the first support member 10. The operating device 56 further includes a rubber ring member 54, and a metallic operating member 63 of a predetermined mass which is connected to an outer circumferential surface of the fixation member 52 through the rubber ring 54. The operating member 63 is concentric with the first support member 10 and the fixation member 52. The pressure-receiving chamber 34 is divided by the operating member 63 into a first section 34a on the side of the first support member 10 and a second section 34b on the side of the partition means 32. The first and second sections 34a, 34b have substantially the same volume.

The operating member 63 consists of an annular flat portion 60 having a central, circular through hole 58, and a cylindrical portion 62 which extends a suitable length concentrically from a circumferential edge of the annular flat portion 60, toward the partition means 32. Thus, the operating member 63 has therein a recess 64 with a predetermined depth in the load-receiving direction which recess is open in the second section 34b toward the partition means 32. The rubber ring 54 is fixed to an inner wall surface of the central through hole 58. The cylindrical portion 62 of the operating member 63 and an inner wall surface of the pressure-receiving chamber 34 (more precisely, an inner circumferential surface of the cylindrical member 14 of the second support member 12), cooperate with each other to define an annular restriction gap 66 between the first and second sections 34a, 34b.

Upon application of a vibrational load to the mount, the non-compressible fluid is forced to flow between the first and second sections 34a, 34b through the restriction gap 66. The vibration with which the fluid in the restriction gap 66 resonates is effectively isolated. The restriction gap 66 is constructed or "tuned" so that the fluid in the gap 66 will resonate with vibration having a frequency f3 of about 300 Hz, such as vibration associated with transmitted engine sound. Thus, the about 300 Hz frequency vibration applied to the mount is effectively isolated based on the resonant response of the fluid in the restriction gap 66.

A first elastic member in the form of a flat rubber ring member 68 is secured at an outer circumferential portion thereof fluid-tightly to an inner wall surface of the opening of the recess 64, while a mass member in the form of a metallic ring member 72 of a predetermined mass is connected to the operating member 63 through the rubber ring 68, which is formed by vulcanization between the metallic ring 72 and the rubber ring 68. More precisely, the rubber ring 68 is vulcanized to a fit ring 76, and the fit ring 76 with the rubber ring 68 is press-fitted in the cylindrical portion 62. Thus, the recess 64 is closed by the rubber ring 68 and the metallic ring 72. The rubber ring 68 is fixed at an inner circumferential surface thereof to an outer circumferential surface of the metallic ring 72. A first communication passage in the form of a though hole 70 is formed through the metallic ring 72. The vibration with which the fluid in the through hole 70 resonates is effectively isolated. The flat rubber ring 68 serves as the first elastic member for the instant elastic mount, as stated above, while the rubber ring 54 serves as a second elastic member for the elastic mount.

The flat portion 60 of the operating member 63 has a plurality of through holes 74 formed therethrough (only one through hole 74 is shown in FIG. 1). Each of the through holes 74 is constructed or "tuned" so that the fluid in each hole 74 will resonate with vibration having a frequency equal to, or higher than, that of the vibration with which the fluid in the through hole 70 (first communication passage) resonates. The fluid in the pressure-receiving chamber 34 flows between the first and second sectons 34a, 34b through the through hole 70, recess 64 and through holes 74. The through holes 74 serve as a second communication passage for the elastic mount.

While, as described above, the fluid in the through hole 70 of the metallic ring 72 is adapted to exhibit a resonant response, the metallic ring 72 itself is also adapted to exhibit a resonant response. The fluid in the through hole 70 and the metallic ring 72 itself exhibit a synergistic resonant response to isolate vibration with a frequency f4 of about 200 Hz, such as vibration associated with booming noise and the like. Thus, the about 200 Hz frequency vibration applied to the mount is effectively isolated.

The operating member 63 is adapted to resonate with vibration having a frequency f5 of about 450 Hz, such as vibration associated with transmitted engine sound, whereby the about 450 Hz vibration is effectively isolated by the instant elastic mount. The frequency f5 is determined depending upon an elastic modulus of the rubber ring 54 (second elastic member), a mass of each of the operating member 63, rubber ring 68 and metallic ring 72, and other parameters.

In FIG. 1, reference numeral 78 designates a first stopper member in the form of a plate disposed in the first section 34a and held between the first support member 10 and the fixation member 52. The stopper plate 78 serves to prevent the operating member 63 from being excessively displaced due to elastic deformation of the rubber ring 54 toward the first support members 10 in the load-receiving direction. Meanwhile, the partition means 32 serves as a second stopper member for preventing the operating member 63 from being excessively displaced toward the second support member 12.

In FIG. 1, reference numeral 80 designates a cushioning member formed by vulcanization of rubber on the outer circumferential surface of the cylindrical portion 62 of the operating member 63, and on a lower end surface of the cylindrical portion 62 opposed to the partition means 32. The cushioning member 80 serves to absorb shock produced upon abutment of the operating member 63 against the inner wall surface 19 of the pressure-receiving chamber 34, or the partition means 32.

By employing the fluid-filled elastic mount constructed as described above in the automotive vehicle, the comparatively low frequency vibration, such as engine shake-associated vibration, which corresponds to the tuned frequency f1, is effectively damped based on the resonant response of the non-compressible fluid in the restricted passage 38, while at the same time the intermediate frequency vibration, such as idling-associated vibration, which corresponds to the tuned frequency f2, is effectively isolated based on the movement (or displacement) of the movable plate 46 in the load-receiving direction. Thus, the present elastic mount provides the same advantages as those of conventional fluid-filled elastic engine mounts.

With the present elastic mount, the about 200 Hz frequency vibration, such as booming noise-associated vibration, which corresponds to the tuned frequency f4 higher than the frequency f2, is effectively isolated based on the synergistic resonant response of the fluid in the through hole 70 and the metallic ring 72 itself.

Further, with the present elastic mount, the about 300 Hz frequency vibration, such as transmitted engine sound-associated vibration, which corresponds to the tuned frequency f3 higher than the frequency f4, is effectively isolated based on the resonant response of the fluid in the restriction gap 66 defined by the cylindrical portion 62 of the operating member 63 and the inner wall surface 19 of the pressure-receiving chamber 34.

Additionally, by using the present elastic mount, the about 450 Hz frequency vibration, such as transmitted engine sound-associated vibration, which corresponds to the tuned frequency f5 higher than the frequency f3, is effectively isolated based on the resonant response of the operating member 63.

As is apparent from the foregoing, the present fluid-filled elastic mount serves to effectively damp or isolate the same two frequency ranges of vibration as those which conventional elastic mounts serve to damp or isolate, and additionally other three frequency ranges of vibration as contrasted with conventional mounts. Each of the other three frequency ranges is higher than the frequency f2 to which the movable plate 46 is tuned and which is the upper limit of the frequency range which has conventionally been covered, namely, effectively damped or isolated by conventional elastic mounts. Thus, the present elastic mount provides a remarkably excellent vibration absorbing (damping or isolating) effect as compared with conventional mounts.

While the present invention has been described with reference to the embodiment of FIG. 1, it is to be understood that the invention may be embodied with other modifications.

For example, while, in the illustrated embodiment, the relationship of the frequency f3 associated with the restriction gap 66 and the frequency f4 associated with the synergistic resonant response of the fluid in the through hole 70 and the metallic ring 72 itself, is determined such that the frequency f3 is higher than the frequency f4, it is possible to reverse the relationship, namely, determined such that the frequency f4 is higher than the frequency f3.

Further, while the illustrated elastic mount employs the operating member 63 which includes the cylindrical portion 62 and the flat portion 60 with the central through hole 58, it is possible to employ an operating member (63) consisting of the cylindrical portion 62 alone. Moreover, through holes (74) serving as the second communication passage may be formed in the rubber ring 54, the fixation member 52, or other members which cooperates with the operating member 63 to define the recess 64.

Figure 2:
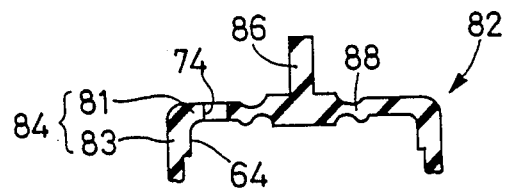
FIG. 2 is a view corresponding to FIG. 1, showing an operating unit member which may be used in place of corresponding members of the engine mount of FIG. 1.

Referring to FIG. 2, reference numeral 82 designates an operating device corresponding to the operating member 63, rubber ring 54 and fixation member 52 of the embodiment of FIG. 1. The operating device or unit 82 is integrally formed of an elastomer or other elastic material having a comparatively low elastic modulus. The operating unit 82 includes a first (fixation) portion 86 corresponding to the fixation member 52 of the embodiment of FIG. 1, and a second portion 84 which includes a circular flat portion 81 corresponding to the circular flat portion 60 in FIG. 1 and a cylindrical portion 83 corresponding to the cylindrical portion 62 in FIG. 1. The operating unit 82 defines therein a recess 64 of a predetermined depth. The fixation portion 86 protrudes from a central portion of one of opposite faces of the flat portion 81, the other face of the flat portion 81 defining a bottom of the recess 64. The operating unit 82 is secured at the fixation portion 86 to the first support member 10. A plurality of through holes 74 functioning as the second communication passage similar to the through holes 74 in FIG. 1, are formed in the flat portion 81. The unit 82 further includes a connection portion 88 of a comparatively small thickness for elastically connecting the first (fixation) portion 86 and the second portion 84. The connection portion 88 is concentric with the fixation portion 86. When the operating unit 82 resonates, the connection portion 88 above all is subjected to elastic deformation. The elastic mount having this type operating member (82) provides the same excellent advantages as those of the elastic mount of FIG. 1.

While in the embodiment of FIG. 1 the movable plate 46 which is displaceable (movable) over a predetermined length, is used as accommodation means for accommodating a pressure difference between the pressure-receiving and equilibrium chambers 34, 36, it is possible to use a diaphragm which is displaceable via deformation by a predetermined amount in a direction in which to accommodate the pressure difference, in place of the movable plate 46.

While the foregoing description relates to the fluid-filled elastic mount applied to an automobile engine, namely, an engine mount, it is to be understood that the concept of the invention is applicable to other sorts of fluid-filled elastic mounts, such as body mounts used on automobiles.

It is to be understood that the present invention is by no means confined to the precise details of the illustrated embodiment and modification, but the invention may be embodied with other changes, modifications and improvements which may occur to those skilled in the art without departing from the spirit and scope of the invention defined in the appended claims.

What is claimed is:

1. A fluid-filled elastic mount for flexible coupling of two members, comprising:
   first support means and second support means which are disposed opposite to each other in a load-receiving direction in which a vibrational load is applied to the elastic mount;

an elastic body interposed between said first and second support means, for elastic connection of said first and second support means;

a closure member secured to said second support means and cooperating with at least said elastic body to define a fluid chamber filled with a non-compressible fluid, said closure member including a flexible portion;

partition means for dividing said fluid chamber into a pressure-receiving chamber formed on the side of said first support means, and an equilibrium chamber formed on the side of said closure member;

communication means for defining a restricted passage for restricted fluid communication between said pressure-receiving and equilibrium chambers;

accommodation means for accommodating a pressure difference between said pressure-receiving and equilibrium chambers, said accommodation means including a movable member which is displaceable in said load-receiving direction due to said pressure difference;

operating means disposed in said pressure-receiving chamber and secured to said first support means, said operating means including an operating member having a recess of a predetermined depth, and dividing said pressure-receiving chamber into a first section formed on the side of said first support means, and a second section formed on the side of said partition means, said recess being open in said second section, said operating member cooperating with an inner wall surface of said pressure-receiving chamber to define an annular restriction gap between said first and second sections, said operating member being elastically connected to said first support means;

a mass member of a predetermined mass located in said recess;

a first elastic member for elastic connection between said mass member and said operating member, whereby said recess is closed by said mass member and said first elastic member;

first means for defining a first communication passage for fluid communication between said recess and said second section, said first means being supported by said mass member; and second means for defining a second communication passage for fluid communication between said recess and said first section, said second means being supported by said operating means.

2. A fluid-filled elastic mount as recited in claim 1, wherein said operating means further includes a second elastic member for the elastic connection between said operating member and said first support means, said operating member being formed of a rigid material.

3. A fluid-filled elastic mount as recited in claim 2, wherein said operating means further includes a fixation member which is secured to said first support means and to which said operating member is connected through said second elastic member.

4. A fluid-filled elastic mount as recited in claim 3, wherein said second means is supported by said operating member.

5. A fluid-filled elastic mount as recited in claim 1, wherein said operating member is formed of an elastic material, and elastically connected to said first support means due to elasticity of the operating member.

6. A fluid-filled elastic mount as recited in claim 5, wherein said second means is supported by said operating member.

7. A fluid-filled elastic mount as recited in claim 1, wherein said second support means includes a cylindrical member for defining said inner wall surface of said pressure-receiving chamber, while said operating member includes a cylindrical portion for partially defining said recess and cooperating with said cylindrical member to define said annular restriction gap.

8. A fluid-filled elastic mount as recited in claim 7, wherein said first elastic member includes a fit ring fitted in the cylindrical portion of said operating member, said mass member being connected to said operating member through said first elastic member with said fit ring fitted in said cylindrical portion.

9. A fluid-filled elastic mount as recited in claim 7, further comprising a cushioning member disposed on an outer circumferential surface of said cylindrical portion of said operating member for absorbing a shock produced from abutment of said operating member against said inner wall surface of said pressure-receiving chamber.

10. A fluid-filled elastic mount as recited in claim 1, further comprising a first stopper member disposed in said first section for preventing said operating member from being excessively displaced toward said first support means.

11. A fluid-filled elastic mount as recited in claim 1, further comprising a stopper means for preventing said operating member from being excessively displaced toward said second support means, said partition means serving as said stopper means.

* * * * *